(No Model.)

C. E. WHITTLESEY.
FASTENING FOR KNOB SPINDLES.

No. 350,609. Patented Oct. 12, 1886.

WITNESSES:
George L. Barnes.
David K. Andrews

INVENTOR
Charles E. Whittlesey.
BY
Julius Twiss,
ATTORNEY

UNITED STATES PATENT OFFICE.

CHARLES E. WHITTLESEY, OF NEW HAVEN, CONNECTICUT.

FASTENING FOR KNOB-SPINDLES.

SPECIFICATION forming part of Letters Patent No. 350,609, dated October 12, 1886.

Application filed August 25, 1886. Serial No. 211,950. (No model.)

*To all whom it may concern:*

Be it known that I, CHARLES E. WHITTLESEY, a resident of the town of New Haven, in the State of Connecticut, have invented new and useful Improvements in Fastenings for Knob-Spindles, of which the following is a specification.

The invention consists in the novel means for securing and holding the knob-spindle to prevent its turning, as hereinafter more fully described and claimed.

Figure 1:
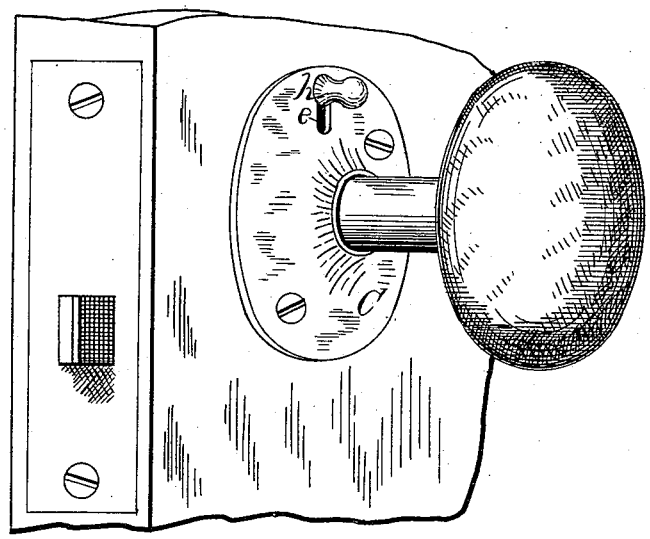
Figure 3:
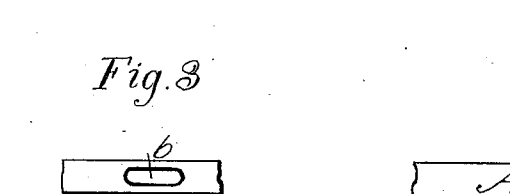
Figure 2:
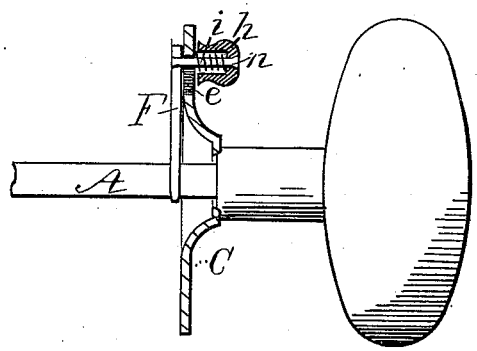
Figure 4:
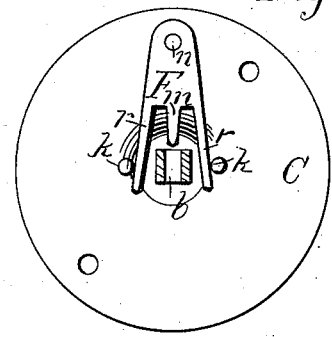
Figure 5:
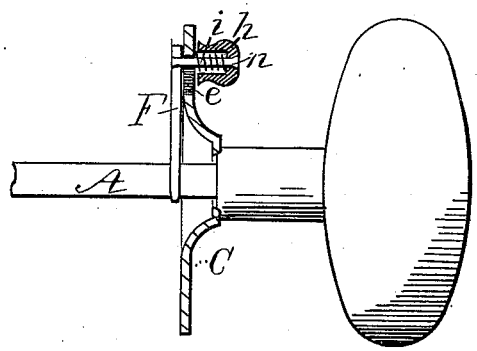

In the accompanying drawings, Figure 1 shows a perspective view of a mounted door-latch embodying my invention. Fig. 2 is a part vertical section centrally through Fig. 1. Fig. 3 shows the slotted part of the latch-spindle. Figs. 4 and 5 are end views, partly in section, showing the locking device in its locked and unlocked positions; and Fig. 6 shows a modification.

Referring to the drawings, A denotes the spindle of a door-latch, which operates the bolt in the usual and well-known manner. A slot, $b$, is formed in the spindle adjacent to the interior side of one of the rosettes C, which form the bearings or supports of the spindle. A radial slot, $e$, is formed in the rosette C above the spindle, in the line with the slot $b$ when the spindle is in its normal position. This slot serves as a guide for a horizontal pin, $n$, secured into a hasp or fastener, F, which is arranged on the inner face of the rosette. A knob or head, $h$, is fastened on the outer end of the pin $n$, and is recessed to receive a spiral spring, $i$, which is coiled around the pin and acts between the rosette and head $h$ to draw the fastener against the rosette and hold it in any position by the friction thus produced. The fastener is provided with a pair of guides, $r$, which straddle the spindle, and a tongue or part, $m$, adapted to fit into the slot $b$ in the spindle.

The fastener is so proportioned that when the pin $n$ is at the upper end of the guiding-slot $e$, as shown in Figs. 2 and 4, the tongue or part $m$ is entirely out of the slot $b$, and the guides $r$ entirely clear the corners of the spindle as it turns. As the fastener is pressed downward from this position by means of the knob $h$, the tongue $m$, which is preferably slightly pointed, as shown, enters the slot in the spindle, and thus locks the spindle and prevents its rotation. The guides serve to direct the tongue into the spindle, and a pair of projections, $k$, are preferably formed on the rosette C, to hold the fastener in a central position.

Figure 6:
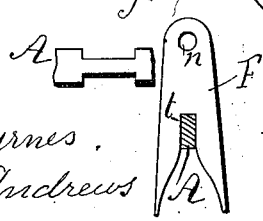

In Fig. 6 is shown a converse arrangement of this improved lock, wherein the fastener is provided with a slot or notch, $t$, which fits upon the spindle. The spindle is reduced in thickness where the fastener bears upon it to about the width of the slot in the first modification. It will be seen that if the spindle were not narrowed, as described, the width of the slot would not be much greater than the distance across the corners of the spindle, and consequently the bolt could be turned if there were much play in the parts.

It is immaterial to which rosette the fastener is attached, so long as the lock is mounted with the device adapted to operate from the side desired.

I claim as new and desire to secure by Letters Patent—

In combination, the spindle A, reduced in thickness where the fastener bears upon it, the rosette C, having the slot $e$, a fastener having guides $r$ and slot $t$, the pin $n$, secured in the fastener and adapted to operate in slot $e$, the knob $h$, fastened on the pin, and a spring located in a recess in said knob and adapted to press the fastener against the rosette, all combined substantially in the manner and for the purpose described.

CHARLES E. WHITTLESEY.

Witnesses:
 JULIUS TWISS,
 DAVID K. ANDREWS.